(No Model.)
R. HARPER.
CORN PLANTER.
No. 303,155. Patented Aug. 5, 1884.
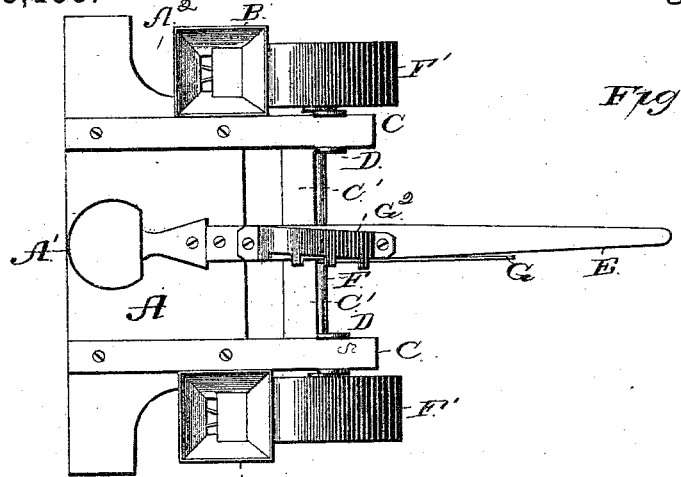
Fig. 1.
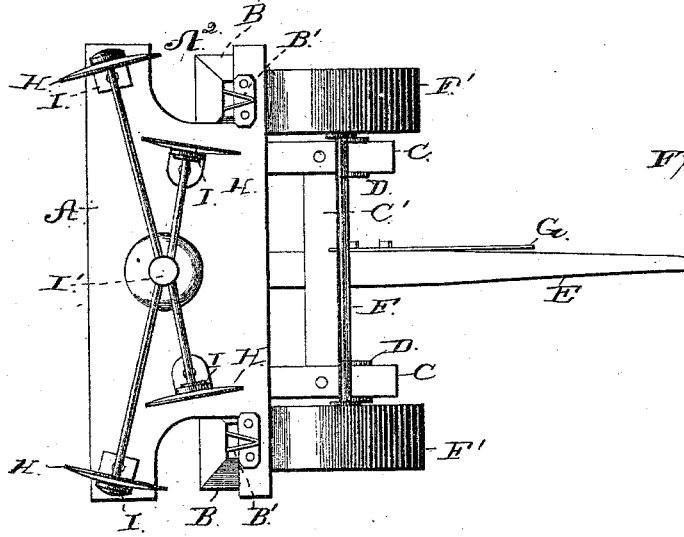
Fig. 2.
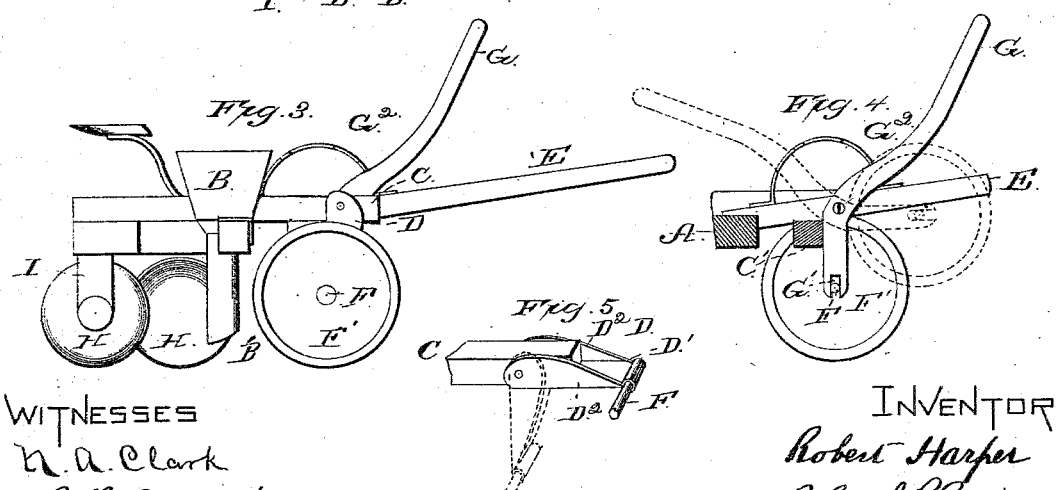
WITNESSES
N. A. Clark
P. B. Turpin
INVENTOR
Robert Harper
By R. S. & A. Lacey

UNITED STATES PATENT OFFICE.

ROBERT HARPER, OF ASSUMPTION, ILLINOIS.

CORN-PLANTER.

SPECIFICATION forming part of Letters Patent No. 303,155, dated August 5, 1884.

Application filed February 21, 1884. (No model.)

*To all whom it may concern:*

Be it known that I, ROBERT HARPER, a citizen of the United States, residing at Assumption, in the county of Christian and State of Illinois, have invented certain new and useful Improvements in Corn-Planters, of which the following is a specification, reference being had therein to the accompanying drawings.

My invention relates to corn-planters; and it consists in the novel construction, combination, and arrangement of the several parts, as will be hereinafter described and claimed.

In the drawings, Figure 1 is a top plan view. Fig. 2 is a bottom plan view. Fig. 3 is a side elevation. Fig. 4 is a détached sectional view. Fig. 5 is a detail view of one of the hinged bearing-boxes, all of which will be described.

The main frame or plate A is adapted to support the driver's seat A', and is cut away or formed with recesses $A^2$ in its opposite sides, through which the seed-flukes can be seen, in order that the working thereof may be ascertained by the driver. The seed-boxes B are mounted on the frame immediately in front of the slots $A^2$, and are provided with depending seed-flukes B'. These flukes are slotted vertically or open at their rear side, in order that the driver may see whether the grain is dropping.

Where so desired, check-rowing attachments may be supplied to the machine in any well-known manner.

From the forward edge of the main frame I project bars or lugs C C, which serve as supports for the hinged bearings D D. These bearings are composed of the bottom plate, D', and the plates $D^2$, projected up from opposite edges of said plate. These plates $D^2$ fit over the bars C, with the plate D' resting against the bottom of the said lugs. The plates $D^2$ are pivoted near their rear edges to the bars C, so that the boxing can be readily turned on this pivot up to a horizontal position or down into a vertical position, as shown in dotted lines, Fig. 5. When the bearings are turned down into the vertical position, they bear at their rear sides against a beam, C', which extends between the bars C, and is secured to the under side thereof, as clearly shown. The tongue E is secured to the main frame and bar C', and extends forward in suitable position. The axle-rod F is secured on the forward outer ends of the hinged bearings, and has the wheels F' spindled on its opposite end and arranged to run immediately in front of the flukes B'. A hand-lever, G, is pivoted on a suitable support, preferably the side of the tongue. The lower end, G', of this lever is slotted and fits over the axle F, and its upper end engages a segment-rack, $G^2$, so the lever can be held at any point desired, and so secure the axle-rod, which is adjusted by said lever, as will be readily understood from the drawings, so as to adapt the machine to different soil and to deep and shallow planting. Disks H H are journaled and arranged in rear of the flukes and on opposite sides of and close to the furrow cut by same. I preferably make these disks concave on the face next the said fluke for the purpose presently described. These disks may be journaled in various ways; but I prefer to support same in the manner shown, which I will now describe. I secure said disks on one end of rods H' and journal said rods near said disks in boxes formed in brackets I, depending from the main frame. The opposite or inner end of the said rods is seated in bearing-sockets formed in a bracket, I', depending centrally from the main frame. It will be seen that each of the disks is secured on a separate rod. Manifestly they might be supported in pairs, with the forward disk on one rod secured on the same rod with the rear disk of the other side; but I prefer the individual rods, as shown, for the purpose of carrying the disks at a uniform depth and allowing each free and independent action.

It will be observed that the inner or forward disks are arranged on the outer side of their brackets I, while the rear ones are arranged on the inner side of their respective brackets. I do this in order to present said disks with as smooth a bearing-face as possible, and throw their supporting-brackets on the side opposite that which engages the soil.

In operation the wheels press the dirt firmly, the flukes open a shallow furrow in said depression with the pressed soil on other side thereof, and the seed is deposited at the base of said furrow. The covering-disks now throw the dirt loosely up over the grain, forming a hill and covering of loose soil. It will be seen that by reversing the order of the arrangement of the disks they will open a furrow by moving the dirt outward. This is useful where it is desired to plant corn in the bottom of a furrow, as is practiced in dry climates.

It will be noticed that I arrange the disks of each pair one slightly in advance of the other. My object in this is to render the operation and draft of the machine easier and to prevent the casting of the seed in the hill to one or the other side thereof. The forward disk will throw the soil up on its side, and then the rear one following up on the opposite side, and the soil does not become clogged between and in front of the disks, as will be understood.

Having thus described my invention, what I claim, and desire to secure by Letters Patent, is—

1. In a corn-planter, the combination, with the seed-flukes, of two covering-disks, both arranged in rear of and on opposite sides of the seed-flukes, said disks being suitably journaled and dished or made concave on the faces next the fluke, and arranged one in advance of the other, substantially as and for the purposes set forth.

2. The combination, substantially as set forth, of the main frame, the supporting-wheels journaled therein, the seed-flukes arranged in rear of the wheels, and the concave covering-disks arranged in rear of and on opposite sides of the seed-fluke, said wheels, flukes, and disks being arranged in line with each other and with the line of draft, substantially as set forth.

3. The combination, with the main frame, the lugs or bars C, extended therefrom, and the beam C', extended between and below the bars C, of the bearings pivoted at their inner ends to the bars C, and adjustable up against the under side of the bars C or down against the forward face of beam C', and the wheels journaled in the outer ends of said bearings, substantially as set forth.

4. The combination, with the framing having forwardly-extended lugs or arms C, and beam C', arranged below and at the rear ends of said lugs, of the bearing D, pivoted at one end to the rear end of lug C, and capable of adjustment alternately against said lug and stop, the axle F, journaled in the outer ends of the bearings, the wheels F', supported on said axle, and lever and rack G G², substantially as set forth.

In testimony whereof I affix my signature in presence of two witnesses.

ROBERT HARPER.

Witnesses:
SILAS A. SHAFER,
THOMAS C. ROWLEY.